2,749,335
DISAZO-DYESTUFFS

Hans Liechti, Riehen, Switzerland, assignor to Ciba Limited, Basel, Switzerland, a Swiss firm No Drawing. Application May 15, 1952,
Serial No. 288,051

Claims priority, application Switzerland June 11, 1951

13 Claims. (Cl. 260—153)

This invention provides new disazo-dyestuffs, for example, the dyestuff of the formula (1)

HO₃S—⟨ ⟩—N=N—⟨ ⟩—NH—OC—⟨ ⟩—NH—C—HN—⟨ ⟩—N=N—⟨ ⟩—OH
HO          HOOC    Cl                       ‖                Cl      SO₃H  COOH
                                             O which contain at least two and at most three sulfonic acid groups and in the form of the free acids correspond to the general formula (2)

HO₃S—⟨ ⟩—N=N—⟨ ⟩—NH—OC—⟨ I ⟩
HO    HOOC    Cl                  NH—X—HN—R₁—N=N—R₂ in which the carbon atoms of the benzene nucleus I bound to the —OC— and —NH— groups are separated from one another by at least one carbon atom, $R_1$ represents a benzene radical bound in para-position to the groups —HN— and —N=N—, and $R_2$ represents the radical of a 1-hydroxybenzene-2-carboxylic acid bound in the 4-position to the azo linkage, and in which one of the radicals $R_1$ and $R_2$ contains a sulfonic acid group, and X represents a —CO— group or a triazine radical, for example a radical of the formula

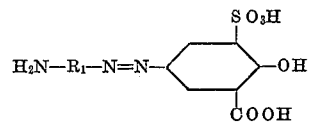

in which Y represents a halogen atom, a hydroxyl group or an amino group, which latter group may contain substituents.

The disazo-dyestuffs of the Formula 2 are made by condensing together by means of phosgene or a cyanuric halide two monoazo-dyestuffs of the formulae (3)   HO₃S—⟨ ⟩—N=N—⟨ ⟩—NH—OC—⟨ I ⟩—NH₂
      HO    HOOC    Cl and (4)   H₂N—R₁—N=N—R₂ in which $R_1$ and $R_2$ have the meanings given above, and, if desired, converting the third remaining halogen atom bound to the cyanuric ring into a hydroxyl group or an amino group which may contain substituents.

The monoazo-dyestuffs of the Formula 3 can be made by coupling a diazotized 1-amino-2-chloro-4-nitrobenzene with 1-hydroxybenzene-2-carboxylic acid, sulphonating the resulting 2'-chloro-4'-nitro-4-hydroxy-1:1'-azo-benzene-3-carboxylic acid and then reducing the nitro group to an amino group, then acylating the resulting amino group with meta- or advantageously para-nitrobenzoyl chloride, and finally reducing the nitro group to an amino group.

As monoazo-dyestuffs of the Formula 4 there are used, for example, those of the formula

H₂N—R₁—N=N—⟨ ⟩—OH
                    SO₃H
                    COOH in which $R_1$ represents a benzene radical free from sulfonic acid groups and bound in para-position to the $H_2N—$ and $—N=N—$ groups, for example, a benzene radical of the formula

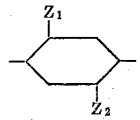

in which $Z_1$ represents a hydrogen atom or a methyl or methoxy group, and $Z_2$ represents a hydrogen atom or a methyl or methoxy group or a chlorine atom. Such mono-azo-dyestuffs can be made, for example, by coupling diazotized 4-amino-1-hydroxybenzene-2-carboxylic acid-6-sulfonic acid with an amine of the benzene series capable of coupling in para-position relatively to the amino group, such as aminobenzene, 1-amino-2- or 3-methylbenzene, 1-amino-2:5-dimethylbenzene, 1-amino-2- or -3-methoxy-benzene, 1-amino-2:5-dimethoxy-benzene or 1-amino-2-methoxy-5-methylbenzene.

The latter coupling is carried out in known manner advantageously in a weakly acid medium, for example, a medium rendered acid with acetic acid. Amines which are difficult to couple such, for example, as aminobenzene, are advantageously coupled in the form of their so-called ω-methane-sulfonic acids, and the ω-methane-sulfonic acid group is subsequently split off.

It is also of advantage to use as the starting material of the Formula 4 2'-chloro-4'-amino-4-hydroxy-1:1'-azo-benzene-3-carboxylic acid-5-sulfonic acid, for which a method of preparation is described above.

There also come into consideration monoazo-dyestuffs of the Formula 4 in which, in contradistinction to those mentioned above, the sulfonic acid group is bound to the radical $R_1$. Compounds of this type can be made by coupling a diazotized para-nitro-amino-benzene sulfonic acid in alkaline solution with a 1-hydroxybenzene-2-carboxylic acid, and then reducing the nitro group to an amino group.

The condensation of the amino-monoazo-dyestuffs of the Formulae 3 and 4 to form asymmetrical urea derivatives by means of phosgene is advantageously conducted in an aqueous medium, preferably with the dyestuff in the form of its alkali salt and with the addition to the phosgenizing mixture of an acid-binding agent, for example, an alkali carbonate, alkali acetate or an alkali orthophosphate or pyrophosphate, in order by the buffering action of these additions to maintain the pH value ranging from about 9.5 to 5.5 which is especially favorable for the reaction with phosgene.

The condensation of the two dyestuffs of the Formulae 3 and 4 with a cyanuric halide, for example, cyanuric bromide, or advantageously cyanuric chloride, and also the condensation of the third halogen atom remaining in the cyanuric radical, may with advantage be conducted in an aqueous medium. The two amino-azo-dyestuffs are advantageously reacted in succession with the cyanuric halide, for example, the dyestuff of the Formula 3 may be reacted first and then the dyestuff of the Formula 4. In the so-obtained binary condensation product the remaining halogen atom bound to the triazine nucleus may be transformed into a hydroxy group or an NH₂-group. When the resulting binary condensation product is to be condensed at the third halogen atom of the cyanuric radical with an amine, it is of advantage to use for this purpose a simple amine of the benzene series, for example, aminobenzene or an aminobenzene sulfonic acid. As already stated in connection with the condensations with the cyanuric halide, the pH value and/or the reaction temperature is advantageously progressively increased at each stage of condensation.

The new dyestuffs of the invention, which correspond to the Formula 2 above, are suitable above all for dyeing or printing cellulose materials, such as cotton, linen and artificial silk or staple fibers of regenerated cellulose. Especially valuable dyeings, which are distinguished by their very good fastness to washing and light, are produced by treating the dyestuffs on the fiber or partly on the fiber and partly in the dye-bath with an agent yielding metal. It is of advantage to use, for example, the process of U. S. Patent No. 2,148,659, in which there is carried out in the same bath first the dyeing and then the treatment with an agent yielding metal. As agents yielding metal there come into consideration preferably agents yielding copper, and especially those which are stable to alkaline solutions, such as complex copper tartrates.

Very valuable dyeings are produced by working according to the processes in which a dyeing or print produced with the metal-free dyestuff is after-treated with an aqueous solution which contains a basic condensation product of formaldehyde with a compound containing at least once the atomic grouping

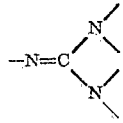

in the molecule or a compound such as cyanamide which is readily convertible into a compound containing such atomic grouping, and which solution also contains a water-soluble copper compound. Such a process is described, for example, in British Patent No. 619,969.

The following examples illustrate the invention, the parts and percentages being by weight:

Example 1

17.25 parts of 1-amino-2-chloro-4-nitrobenzene are diazotized in known manner and coupled with 13.8 parts of 1-hydroxybenzene-2-carboxylic acid in a weakly acid to alkaline solution.

32.15 parts of the separated and dried dyestuff are introduced into 120 parts of fuming sulfuric acid having a content of free anhydride of 20 per cent., and the whole is heated while stirring well for 10 hours at 95–100° C. After cooling, the reaction mass is poured on to ice, stirred for a few hours and filtered. The dyestuff paste is dissolved in 350 parts of hot water, and filtered, a small portion of the unsulfonated dyestuff remaining on the filter. The filtrate is mixed with sodium hydroxide solution of 30 per cent. strength until the reaction becomes alkaline to Brilliant Yellow paper and the sodium salt of the dystuff is precipitated with sodium chloride.

The dyestuff paste is dissolved in 500 parts of water and the nitro group is converted into an amino group by means of 9.2 parts of sodium hydrosulfide at 60–70° C., and the aminoazo-dyestuff is precipitated with sodium chloride and separated by filtration.

The dyestuff paste is dissolved in 800 parts of water, and 16 parts of anhydrous sodium carbonate are added to the solution, and then 26 parts of para-nitrobenzoyl chloride dissolved in 50 parts of acetone are run in at 40–50° C. When the condensation has finished, the precipitated dyestuff is filtered off, and the nitro group is converted into an amino group in the usual manner by means of sodium sulfide at about 60–65° C.

49 parts of the separated and dried dyestuff, or a corresponding amount of the dyestuff paste, and 37.1 parts of 4' - amino - 2' - chloro - 4 - hydroxy - 1:1' - azobenzene-3-carboxylic acid-5-sulfonic acid are treated with phosgene in known manner in the presence of sodium carbonate as an acid-binding agent and sodium acetate as a buffer substance until amino groups can no longer be detected. The completely precipitated dyestuff is filtered off and dried. The new dyestuff is a yellow-brown powder which dissolves in water with a yellow coloration and dyes cotton and regenerated cellulose pure greenish yellow tints, having good properties of wet fastness and fastness to light. By the single bath or 2-bath after-coppering process there are obtained greenish yellow tints of high purity and having very good properties of wet fastness and fastness to light.

Instead of 4' - (4" - amino) - benzoylamino - 2'-chloro-4 - hydroxy - 1:1' - azobenzene - 3 - carboxylic acid - 5-sulfonic acid there may be used 4'-(3"-amino)-benzoylamino - 2' - chloro - 4 - hydroxy - 1:1' - azobenzene-3-carboxylic acid-5-sulfonic acid, a dyestuff being obtained which possess valuable properties similar to those of the disazo-dyestuff first described in this example.

Example 2

A solution of 49 parts of 4'-(4"-amino)-benzoylamino-2'-chloro-4-hydroxy-1:1'-azobenzene-3-carboxylic acid-5-sulfonic acid and 10.6 parts of sodium carbonate in 2000 parts of water is poured at 5° C. in the course of 10 minutes into a suspension of 18.4 parts of cyanuric chloride in a small amount of ice water, and the hydrochloric acid formed is neutralized with a solution of 8.4 parts of sodium bicarbonate in 30 parts of water. After 1 hour the condensation is finished. A solution, having a temperature of 40° C. of 37.1 parts of 4'-amino-2'-chloro-4 - hydroxy - 1:1' - azobenzene - 3 - carboxylic acid - 5-sulfonic acid in 1000 parts of water is then poured in, and the temperature is maintained at 30–35° C. for 12 hours while stirring well. During this period, a solution of 10 parts of sodium bicarbonate in 35 parts of water is introduced dropwise. 20 parts of aniline are then poured in, the whole is heated for 2 hours at 85–90° C., 10.6 grams of sodium carbonate are strewn in, and the condensation product is salted out with sodium chloride.

The new dyestuff is a yellow powder which dissolves in water with a yellow coloration, and dyes cotton and regenerated cellulose very pure yellow tints. By the single bath or 2-bath after-coppering process there are obtained yellow tints of very good fastness to washing and light.

By using, instead of aniline, aminobenzene-3- or -4-sulfonic acid there are obtained dyestuffs having three sulfonic acid groups in the molecule. These dyestuffs possess the same good properties as that produced with aniline.

The dyestuffs produced either by leaving the third reactive chlorine atom in the cyanuric radical unreacted or by replacing the chlorine atom by a hydroxyl group by hydrolysis with an alkaline agent, possess the same good dyeing properties as the dyestuffs previously described.

*Example 3*

49 parts of the 4'-(4''-amino)-benzoylamino-2'-chloro-4 - hydroxy - 1:1' - azobenzene - 3 - carboxylic acid - 5-sulfonic acid produced as described in Example 1 and 33.7 parts of 4'-amino-4-hydroxy-1:1'-azobenzene-3-carboxylic acid-2'-sulfonic acid are linked together in the usual manner by means of phosgene to form an asymmetrical urea.

The completely precipitated dyestuff is separated by filtration and dried. It is a brown powder which dissolves in water with an orange coloration, and dyes cotton and regenerated cellulose very pure yellow tints. By the single bath or 2-bath after-coppering process there are obtained yellow tints of very good fastness to washing and light.

Instead of 4' - amino - 4 - hydroxy - 1:1' - azobenzene - 3 - carboxylic acid - 2' - sulfonic acid, there may be used 4' - amino - 4 - hydroxy - 5 - methyl - 1:1' - azobenzene - 3 - carboxylic acid - 2' - sulfonic acid. The two amino-monoazo dyestuffs mentioned above can be made by coupling diazotized 1-amino-4-nitrobenzene-sulfonic acid with hydroxybenzene-2-carboxylic acid or 1-hydroxy-6-methylbenzene-2-carboxylic acid in alkaline solution, and then reducing the nitro group to an amino group.

By using instead of 4'-amino-4-hydroxy-1:1'-azobenzene-3-carboxylic acid-2'-sulfonic acid, 4'-amino-4-hydroxy - 1:1' - azobenzene - 3 - carboxylic acid - 3' - sulfonic acid there is obtained a dyestuff having the same dyeing properties. This amino-azo-compound may be prepared by coupling 1-amino-4-diazobenzene-2-sulfonic acid with 1-hydroxybenzene-2-carboxylic acid in alkaline solution.

Instead of 4'-(4''-amino)-benzoylamino-2'-chloro-4-hydroxy - 1:1' - azobenzene - 3 - carboxylic acid - 5 - sulfonic acid, there may be used for the synthesis of the asymmetrical urea derivative 4'-(3''-amino)-benzoylamino - 2' - chloro - 4 - hydroxy - 1:1' - azobenzene - 3 - carboxylic acid - 5 - sulfonic acid.

*Example 4*

49 parts of 4' - (4'' - amino) - benzoylamino - 2'-chloro -4- hydroxy - 1:1' - azobenzene - 3 - carboxylic acid-5-sulfonic acid prepared as described in Example 1 and 36.5 parts of 4'-amino-2':5'-dimethyl-4-hydroxy-1:1'-azobenzene-3-carboxylic acid-5-sulfonic acid are treated with phosgene in a weakly alkaline solution until primary amino groups can no longer be detected.

The urea derivative obtained from the above components, after it has been completely precipitated, is separated by filtration, and dried. It is a brown powder which dissolves in water with an orange coloration and dyes cotton and regenerated cellulose very pure yellow tints. By the single bath and 2-bath after-coppering process there are obtained yellow tints of very good fastness to washing and light.

The 4' - amino - 2':5' - dimethyl - 4 - hydroxy - 1:1'-azobenzene - 3 - carboxylic acid - 5 - sulfonic acid used for producing the above dyestuff is advantageously prepared by coupling diazotized 4-amino-1-hydroxybenzene-2-carboxylic acid-6-sulfonic acid with 1-amino-2:5-dimethylbenzene in an acetic acid solution.

Further valuable disazo-dyestuffs are made by using, instead of the amino-monoazo-dyestuff from 1-amino-2:5-dimethylbenzene, for producing the urea compound the corresponding monoazo-dyestuff from the above mentioned diazo compound and one of the following azo components: Aminobenzene, 1-amino-2- or -3-methylbenzene, 1-amino-2:5-dimethoxybenzene, 1-amino-2- or - 3 - methoxybenzene and 1 - amino-2-methoxy-5-methylbenzene.

Instead of 4' - (4'' - amino)-benzoylamino-2'-chloro-4-hydroxy-1:1'-azobenzene-3-carboxylic acid - 5 - sulfonic acid, 4' - (3'' - amino) - benzoylamino-2'-chloro-4-hydroxy - 1:1' - azobenzene-3-carboxylic acid-5-sulfonic acid may be condensed with 4'-amino-2':5'-dimethyl-4-hydroxy-1:1'-azobenzene-3-carboxylic acid-5-sulfonic acid to form the asymmetrical urea.

*Example 5*

100 parts of cotton are entered at 50° C. into a dyebath containing in 4000 parts of water 2 parts of anhydrous sodium carbonate and 0.7 part of the dyestuff obtainable as described in the first five paragraphs of Example 1. The temperature is slowly raised to the boil, 30 parts of crystalline sodium sulfate are added, and dyeing is carried on for ¾ hour at about 95° C. The bath is then allowed to cool to about 70° C., 1 part of complex sodium copper tartrate is added, and the cotton is further treated for ½ hour at about 80° C. and is then rinsed with cold water. There is obtained a yellow dyeing of very good fastness to washing and light.

What is claimed is:

1. A disazo-dyestuff which contains at least two and at most three sulfonic acid groups and corresponds to the formula

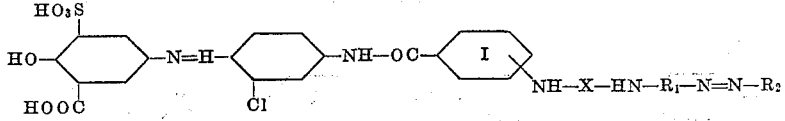

in which the carbon atoms of the benzene nucleus I bound to the —OC— and —NH— groups are separated from one another by at least one carbon atom, $R_1$ represents a benzene radical bound in para-position to the groups —HN— and —N=N—, and $R_2$ represents the radical of a 1-hydroxybenzene-2-carboxylic acid bound in 4-position to the azo linkage, one of the radicals $R_1$ and $R_2$ containing a sulfonic acid group, and X represents a member selected from the group consisting of a —CO— radical and a triazine radical.

2. A disazo-dyestuff which contains at least two and at most three sulfonic acid groups and corresponds to the formula

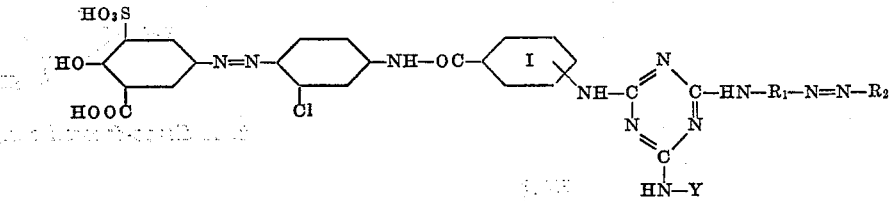

in which the carbon atoms of the benzene nucleus I bound to the —OC— and —NH— groups are separated from one another by at least one carbon atom, $R_1$ represents a benzene radical bound in para-position to the groups —NH— and —N=N—, $R_2$ represents the radical of a 1-hydroxybenzene-2-carboxylic acid bound in 4-position to the azo linkage, one of the radicals $R_1$ and $R_2$ containing a sulfonic acid group and Y represents a benzene radical.

3. A disazo-dyestuff which contains two sulfonic acid groups and corresponds to the formula

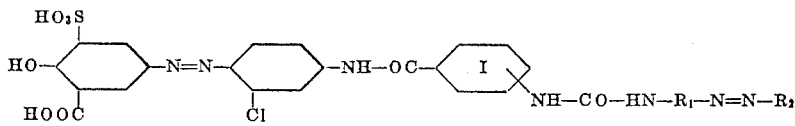

in which the carbon atoms of the benzene nucleus I bound to the —OC— and —NH— groups are separated from one another by at least one carbon atom, $R_1$ represents a benzene radical bound in para-position to the group —NH— and —N=N—, $R_2$ represents the radical of a 1-hydroxy benzene-2-carboxylic acid bound in 4-position to the azo-linkage, one of the radicals $R_1$ and $R_2$ containing a sulfonic acid group.

4. A disazo-dyestuff which contains at most three sulfonic acid groups and corresponds to the formula

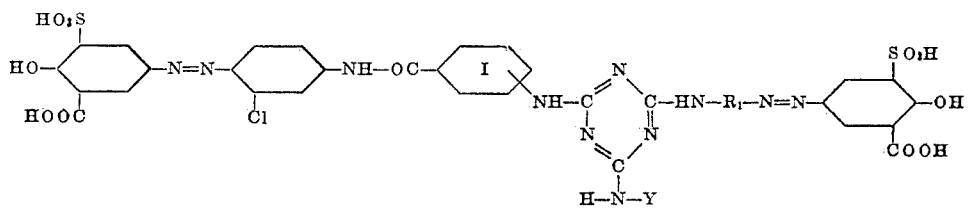

in which the carbon atoms of the benzene nucleus I bound to the —OC— and —NH— groups are separated from one another by at least one carbon atom, $R_1$ represents a benzene radical bound in para-position to the groups —NH— and —N=N—, and Y represents a benzene radical.

5. A disazo-dyestuff which contains at most three sulfonic acid groups and corresponds to the formula

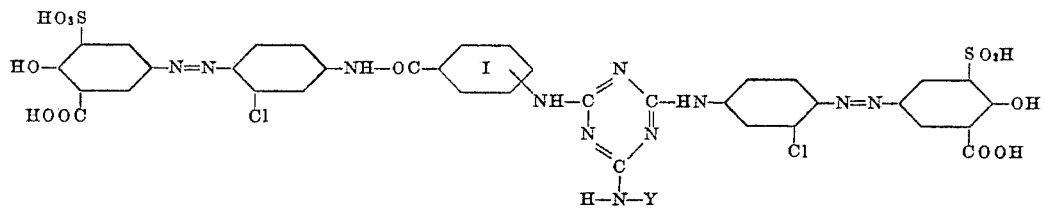

in which the carbon atoms of the benzene nucleus I bound to the —OC— and —NH— groups are separated from one another by at least one carbon atom, and wherein Y represents a benzene radical.

6. The disazo-dyestuff of the formula

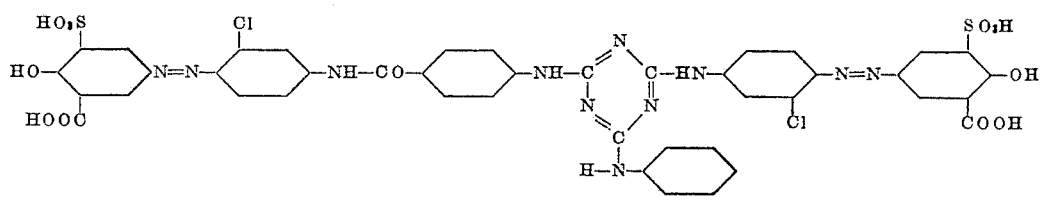

7. The disazo-dyestuff of the formula

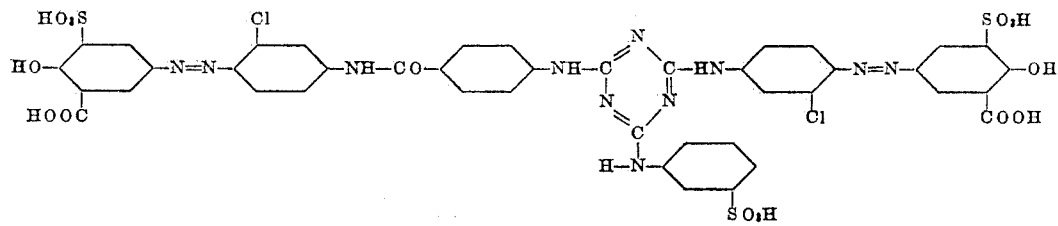

8. A disazo-dyestuff corresponding to the formula

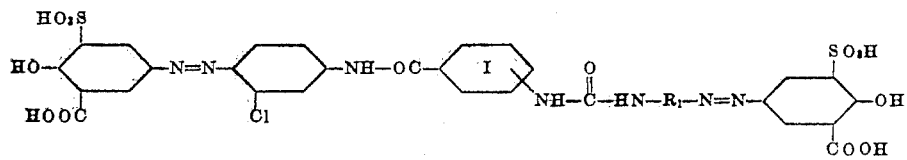

in which the carbon atoms of the benzene nucleus I bound to the —OC— and —NH— groups are separated from one another by at least one carbon atom, $R_1$ represents a benzene radical bound in para-position to the group —NH— and —N=N— and free from sulfonic acid groups.

9. A disazo-dyestuff corresponding to the formula

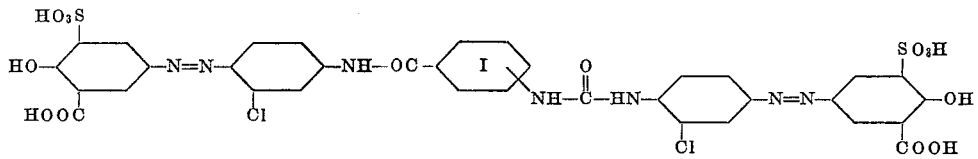

in which the carbon atoms of the benzene nucleus I bound to the —OC— and —NH— groups are separated from one another by at least one carbon atom, $Z_1$ represents a member selected from the group consisting of a hydrogen atom, a methyl and a methoxy group and $Z_2$ represents a member selected from the group consisting of a hydrogen and a chlorine atom, a methyl and a methoxy group.

10. A disazo-dyestuff of the formula

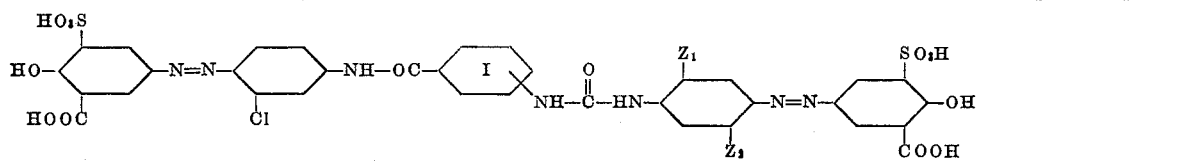

in which the carbon atoms of the benzene nucleus I bound to the —OC— and —NH— groups are separated from one another by at least one carbon atom.

11. The disazo-dyestuff of the formula

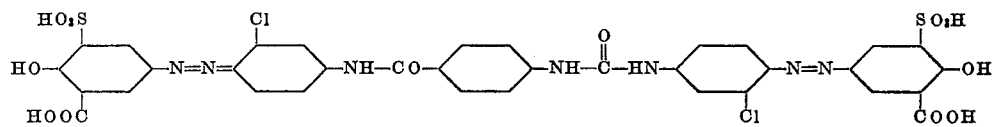

12. The disazo-dyestuff of the formula

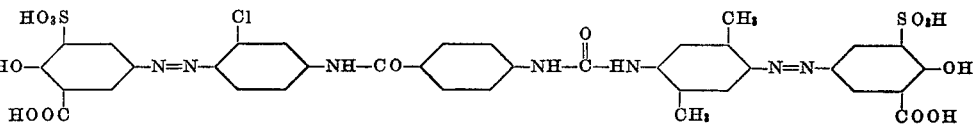

13. The disazo-dyestuff of the formula

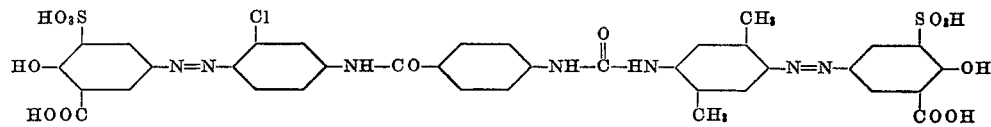

References Cited in the file of this patent
UNITED STATES PATENTS

| | | |
|---|---|---|
| 2,283,261 | Kaiser | May 19, 1942 |
| 2,341,791 | Kaiser | Feb. 15, 1944 |
| 2,375,561 | Kaiser | May 8, 1945 |
| 2,667,477 | Liechti | Jan. 26, 1954 |